United States Patent
Erickson

[11] Patent Number: 6,158,241
[45] Date of Patent: Dec. 12, 2000

[54] LPG RECOVERY FROM REFORMER TREAT GAS

[76] Inventor: Donald C. Erickson, 1704 S. Harbor La., Annapolis, Md. 21401

[21] Appl. No.: 09/004,161

[22] Filed: Jan. 1, 1998

[51] Int. Cl.[7] .............................. F25J 1/00; F25B 27/00
[52] U.S. Cl. .................. 62/613; 62/623; 62/912; 62/936; 62/238.3
[58] Field of Search .......................... 62/613, 618, 238.3, 62/623, 936, 912

[56] References Cited

U.S. PATENT DOCUMENTS

| | | | |
|---|---|---|---|
| 2,650,480 | 9/1953 | Gilmore | 62/5 |
| 2,667,764 | 2/1954 | Turner | 62/119 |
| 2,726,519 | 12/1955 | Squier | 62/175.5 |
| 2,742,407 | 5/1956 | Irvine | 196/73 |
| 2,769,309 | 11/1956 | Irvine | 62/2 |
| 2,826,049 | 3/1958 | Gilmore | 62/179 |
| 2,909,905 | 10/1959 | Mitchell et al. | 62/23 |
| 3,166,914 | 1/1965 | Hallatt | 62/101 |
| 4,462,813 | 7/1984 | May et al. | 62/912 |
| 5,323,616 | 6/1994 | Chretien et al. | 62/912 |
| 5,326,929 | 7/1994 | Mehra et al. | 585/809 |
| 5,561,988 | 10/1996 | Mehra | 62/625 |
| 5,768,904 | 6/1998 | Tagamolila et al. | 62/238.3 |
| 5,924,306 | 7/1999 | Sinelnikov | 62/623 |

OTHER PUBLICATIONS

D.C. Erickson et al. "Waste Heat Powered Ammonia Absorption Refrigeration System". Aiche Symposium Series. Aug. 1997.

*Primary Examiner*—William Doerrler

[57] ABSTRACT

LPG and gasoline are recovered from catalytic reformer plant treat gas and net gas by refrigeration-induced condensation and separation, using reformer plant waste heat to produce the refrigeration in an ammonia absorption refrigeration unit. Referring to FIG. 2, reformer waste heat from exchanger 21 powers absorption refrigeration unit 22, which supplies refrigeration to chiller 25. Net gas and treat gas is recuperatively cooled in recuperator 24, chilled in chiller 25, and separated in separator 26. Absorption refrigeration may also be supplied to cool FCC compressor inlet vapor to below ambient, either in conjunction with treat gas chilling or independently. Other waste heat streams may also be used.

9 Claims, 4 Drawing Sheets

LPG RECOVERY FROM REFORMER TREAT GAS

BACKGROUND OF THE INVENTION

Oil refineries normally include a catalytic reformer plant which aromaticizes a desulfurized naphtha cut from the crude column. Net hydrogen is generated in the process of reforming naphtha to benzene, toluene, xylene, and other aromatics. At least a portion of the net yield of hydrogen is normally used to desulfurize the naphtha and/or other streams.

The reform reactor effluent is conventionally recuperatively cooled against recycle gas and influent gas, and then cooled by ambient cooling to condense and remove liquid product. The remaining hydrogen-rich gas is compressed in a recycle compressor, and desulfurizer treat gas is withdrawn.

One problem with this conventional practice is that between 5 and 15 volume percent of the treat gas is $C_3$ or heavier ($C_3+$), and would be a salable liquid were it recovered. After the desulfurization step, the $C_3+$ is found in the desulfurizer separator off gas or the stripper off gas. Because of $H_2S$ and H2O content, these streams are not suitable for refrigerated recovery of liquid $C_3+$ unless preceded by $H_2S$ and $H_2O$ removal, and are therefore generally only suitable for refinery fuel or flaring.

There are several examples in the prior art of use of a hot hydrocarbon liquid stream withdrawn from a distillation column to power a LiBr—$H_2O$ absorption chiller, and then use of the +5° C. cooling produced by the LiBr chiller to condense the overhead vapor from the same column. See for example U.S. Pat. Nos. 2,726,519, 2,742,407, and 2,769,309. There are also prior art examples of the use of $NH_3$—$H_2O$ absorption refrigeration for refrigerating hydrocarbons: both single-stage systems (U.S. Pat. No. 2,909,905) and two-stage (double-lift) systems: U.S. Pat. Nos. 2,650,480, 2,826,049, and 3,166,914. The lower refrigeration temperatures of $NH_3$—$H_2O$ units compared to LiBr require that the generator temperature be correspondingly higher. Presumably that is why all the ammonia absorption refrigeration prior art disclosures for hydrocarbon processing recite steam heating or direct-fired heating, as opposed to direct heating by low temperature waste heat gas streams.

It would be desirable, and included among the objects of this invention, to recover salable liquid from desulfurizer treat gas and reformer net gas and correspondingly to increase the $H_2$ content of the treat gas. It would be especially desirable to do so in a manner which does not require a mechanical refrigeration compressor or a turbo-expander and does not consume large quantities of electrical or shaft power. It would further be desirable to directly use low temperature waste heat to produce the refrigeration used to recover salable liquid, and to obtain the waste heat from the gas stream being treated.

DISCLOSURE OF THE INVENTION

The above and further useful objectives are obtained by process and apparatus wherein heat is transferred from the effluent reformate before the ambient cooling step directly to an ammonia absorption refrigeration unit, whereby refrigeration below −15° C. is produced, and wherein the treat gas is refrigerated to below −10° C. from said refrigeration so as to condense $C_3$ and heavier hydrocarbons from the gas. After vapor-liquid separation, the cold gas is preferably recuperatively warmed against influent treat gas before routing to the desulfurizer and other possible uses. In another embodiment, refinery waste heat is used to refrigerate recuperatively cooled treat gas to below −10° C. whereby $C_3+$ is condensed out and separated as a separate product. The waste heat may be in any form, e.g., low-pressure steam or hot oil. Advantageously a second higher temperature chilling may be supplied from the same apparatus, thus enabling an intermediate pressure flash of the letdown absorbent solution. The recovered liquid is desirably separated into gasoline (C5 and heavier) and LPG ($C_3$ and $C_4$) in an existing refinery distillation column, e.g., the crude stabilizer. The higher temperature chilling is advantageously supplied to cool FCC regeneration air or FCC main column overhead vapor (i.e., inlet to the wet gas compressors) to below ambient temperature, e.g., between 0° C. and 7° C.

BEST MODE FOR CARRYING OUT THE INVENTION

Figure 1:
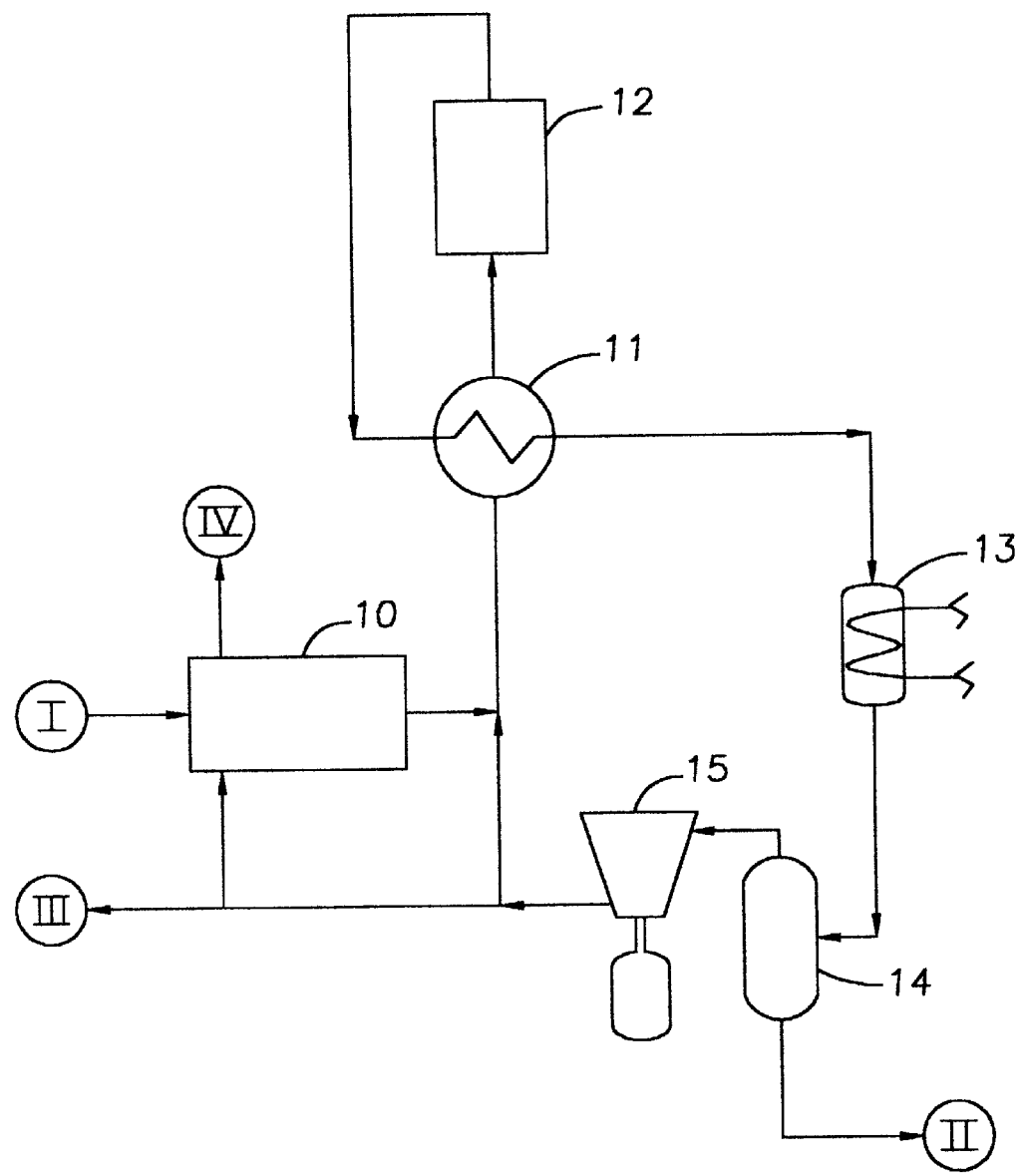
FIG. 1 is a simplified schematic flowsheet of a generic prior art catalytic reformer plant including desulfurizer.

Referring to FIG. 1, a supply of naphtha designated I is desulfurized in desulfurizer 10, combined with recycle gas and routed to recuperator 11, and thence to reforming section 12, comprised of furnace sections and reactor beds. The hot reformate is then recuperatively cooled in recuperator 11, and further cooled by heat rejection to ambient at heat exchanger 13. Condensate is withdrawn from separator 14 at 11, and the gas is routed to recycle compressor 15. The majority of the gas recycles to the reactors, while part is withdrawn as treat gas for desulfurizer 10, and as net gas (III).

Figure 2:
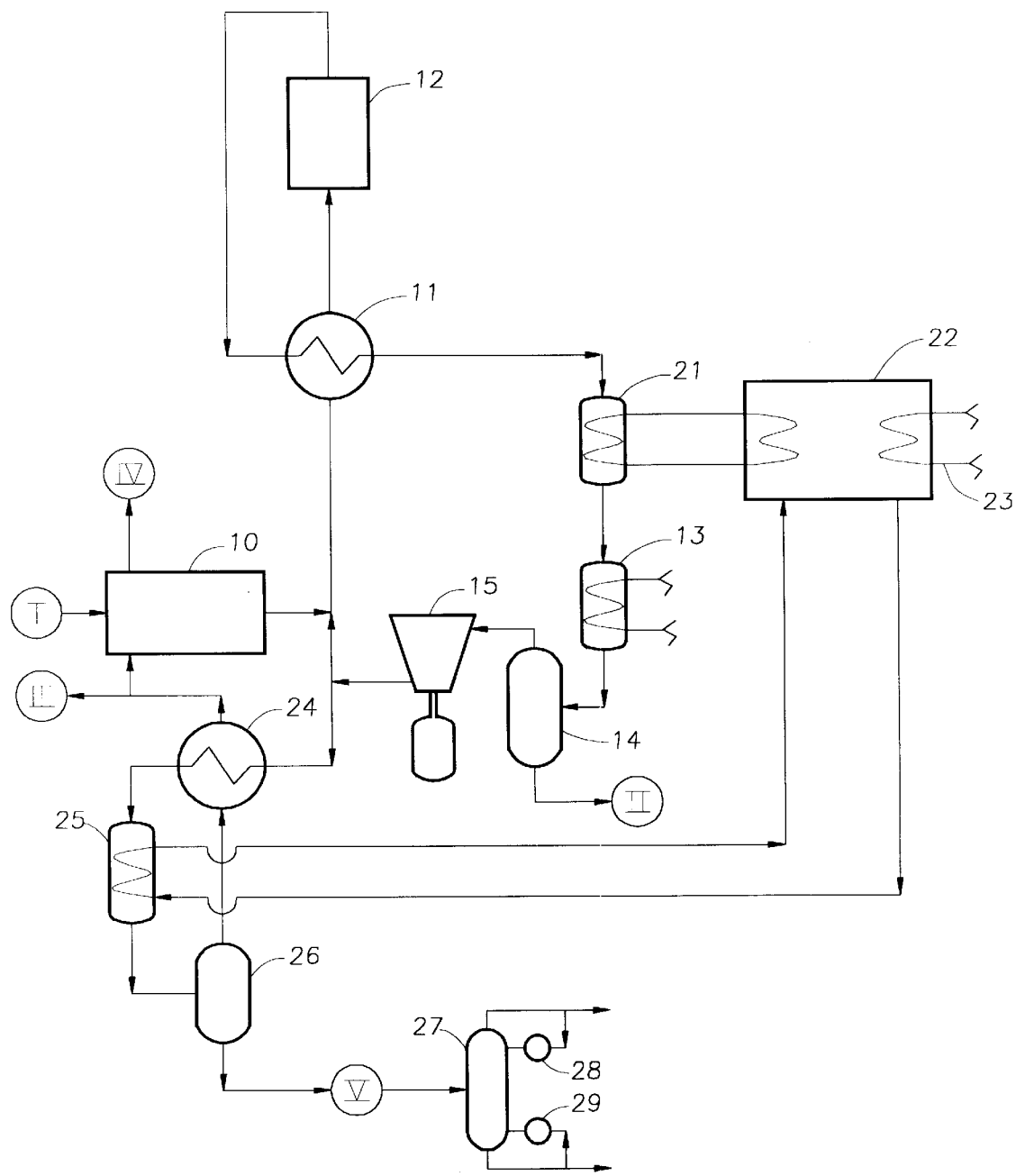
FIG. 2 is a first embodiment of the invention, showing refrigeration recovery of $C_3+$ from the treat gas and net gas, and recovery of waste heat from the circulatory gas to the refrigeration plant.

FIG. 2 depicts the additional components (21 through 26) which are added to the FIG. 1 flowsheet to achieve a first embodiment of the invention. Heat exchanger 21 supplies waste heat from the circulating stream (prior to heat rejection to ambient) to waste heat-powered absorption refrigeration plant 22. The heat input from heat exchanger 21, and also from chiller 25 is rejected at heat exchanger 23, for example to cooling tower water or air cooling. The net gas and treat gas is recuperatively cooled in recuperator 25, then further cooled to below −15° C. in chiller 25, whereby $C_3+$ condenses. Chiller 25 receives liquid refrigerant from absorption plant 22, and returns refrigerant vapor to it. Temperatures as low as −50° C. are possible and advantageous in this application using waste heat-powered absorption refrigeration. The condensate is separated from the remaining vapor in separator 26, and the vapor is re-warmed in recuperator 24 before routing to the desulfurizer 10 and elsewhere. Liquid $C_3+$ from separator 26 (symbol V) is preferably separated at least into LPG and gasoline fractions using an existing refinery distillation column 27, e.g., the crude stabilizer, or with LPG overhead at reflux condenser 28 and gasoline bottoms at reboiler 29.

Thus a few simple retrofittable components effect a major reduction in $C_3+$ content of stream IV (desulfurizer off gas) and also the net gas stream (III). Hydrogen pressure is preserved, hydrogen purity is increased, and hydrogen recovery is nearly 100%. Even when the $C_3+$ recovered from gases sent to the fuel header necessitates replacement with natural gas, the value of the recovered liquids substantially exceeds the cost of replacement gas.

Figure 3:
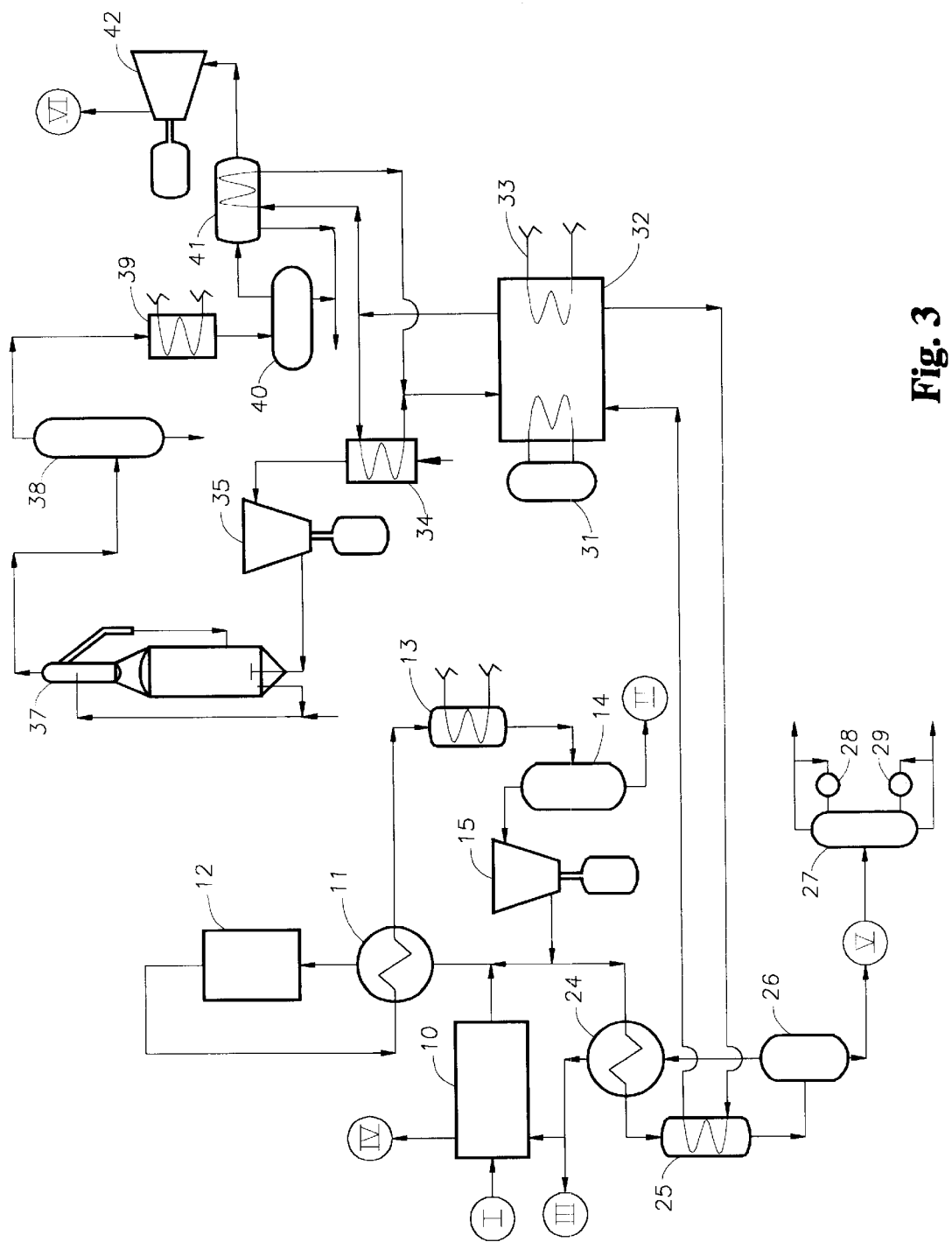
FIG. 3 is a second embodiment, wherein refrigeration is also supplied to the FCC plant.

FIG. 3 illustrates further advantageous features of this invention the use of a single absorption refrigeration plant powered by refinery waste heat to supply different refinery refrigeration loads at different temperatures. In addition to the catalytic reformer plant which incorporates refrigerative recovery of $C_3+$ from the net/treat gas as previously described (components 11 through 15 and 24 through 26) the following additional or revised components are incorporated.

Referring to FIG. 3, refrigeration plant 32 receives refinery waste heat from component 31, which can variously represent low pressure steam, hot oil, or direct exchange with a refinery stream. Heat is rejected to ambient at exchanger 33. Refrigeration is produced in plant 32 at two temperatures. The lower temperature refrigeration, in the range of −15° C. to −50° C., is supplied to chiller 25, as previously described. The warmer temperature refrigeration, between −15° C. and 10° C., but typically at about 0° C. to avoid icing or hydrate formation, is supplied to chillers 34 and 41. Chiller 34 pre-cools the inlet air to regeneration air compressor 35, thereby increasing the air throughput to the regenerator section 36 of fluidized catalytic cracker 37, and increasing compressor efficiency. The cracked gas from FCC 37 is routed to main column 38, where it is distilled to various fractions. The overhead vapor from main column 38 is then cooled and partially condensed by heat rejection to ambient in exchanger 39, and the liquid fraction is separated in separator 40. Conventionally the vapor would then be routed directly to wet gas compressor 42 for further compression downstream recovery at stream VI. However by applying chilling as disclosed at exchanger 41 to the inlet vapor to compressor 42, and removing the condensate, the capacity of compressor 42 increases while its suction pressure decreases. This in turn increases the throughput capacity of main column 38 and FCC 37. Thus heavier crudes and more residual oil can be processed to valuable product in existing equipment.

It will be recognized that either chiller 34 or chiller 41 may be present individually, without the other one. This is determined by where the limiting bottleneck is in the FCC plant, i.e., on regeneration side or on cracking/distillation side. Also there must be adequate capacity in the main column for increased throughput without flooding, or the increased wet gas compressor capacity will not be fully usable. Any other refinery compressor can similarly be provided with inlet vapor chilling to yield the dual benefits of debottlenecking and increased compression efficiency. Also there is no need for the same refrigeration plant to provide two different levels of temperature, although that does provide some benefit as illustrated by FIG. 4.

Figure 4:
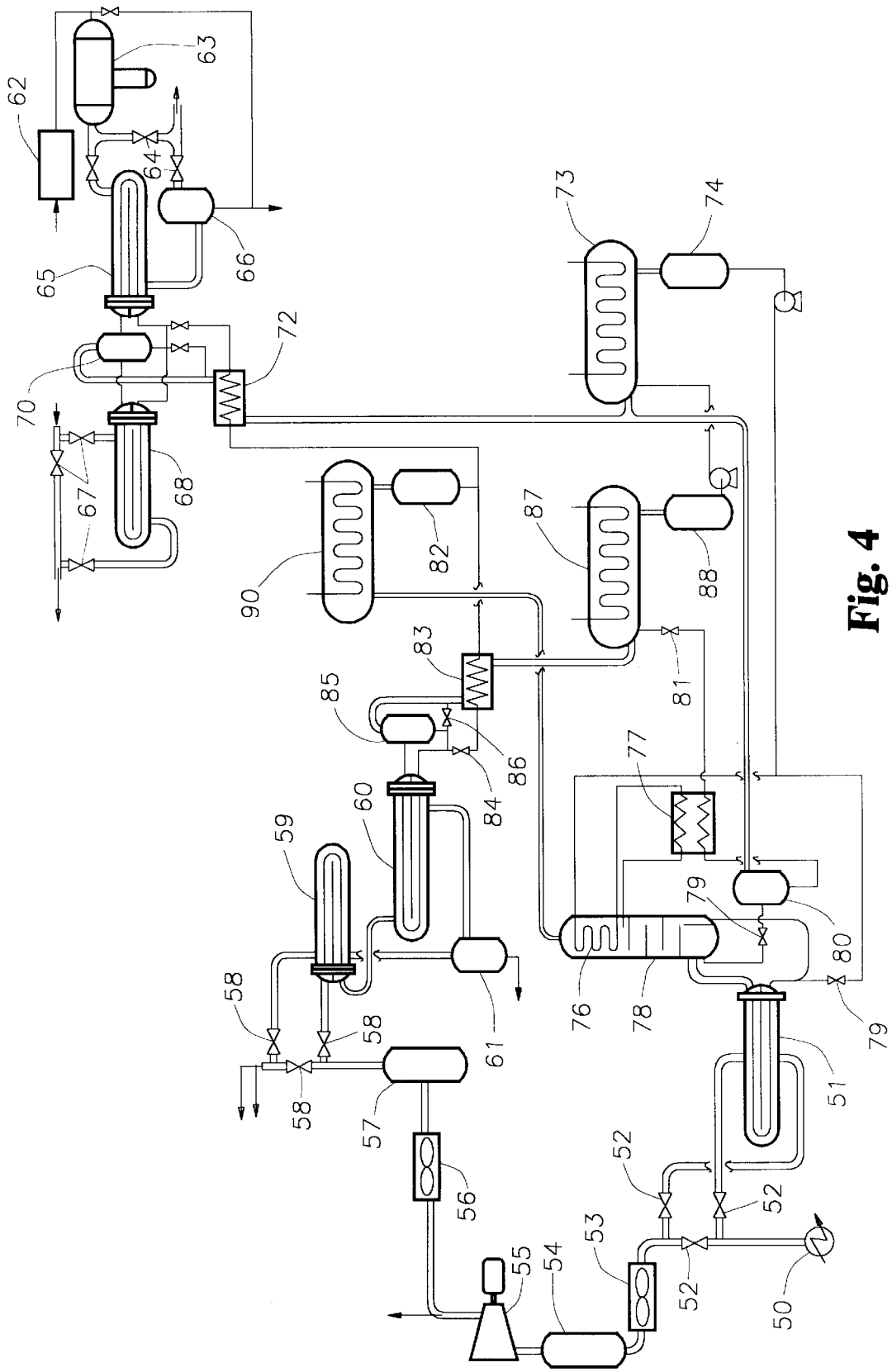
FIG. 4 is a third embodiment, showing preferred details of the absorption refrigeration plant.

FIG. 4 illustrates advantageous flowsheet features for the absorption plant, as well as the tie-ins to other refinery systems. Circulating reformer effluent from recuperator 50 is supplied to absorption plant generator 51 via three valve manifold 52, prior to cooling in fin fan 53, separation in separator 54, and compression in recycle compressor 55. The net gas and treat gas is then cooled again in exchanger 56, separated in separator 57, and then supplied to recuperator 59 and chiller 60 via three valve manifold 58. Condensed $C_3+$ is separated at separator 61. The liquid is withdrawn at the bottom and sent to the crude stabilizer (after being warmed against liquid refrigerant or other stream) and the vapor is routed back through recuperator 59.

At the FCC plant, main column overhead is cooled in exchanger 62, separated in separator 63, and then routed through three valve manifold 64 to intermediate pressure chiller 65. Condensate is separated in separator 66, and the cooled, reduced volume wet gas is then routed to the compressor. Simultaneously another refinery stream (e.g., overhead reflux liquid for a column) is routed via three valve manifold 67 to intermediate pressure chiller 68. Liquid refrigerant is supplied to both chillers via letdown valve 69 and common vapor liquid separator 70. The refrigerant vapor plus a small amount of liquid through purge valve 71 are routed to the intermediate pressure refrigerant heat exchanger 72. The warmed vapor is absorbed in intermediate pressure absorber 73, which is cooled by heat rejection to ambient. Solution receiver 74 and solution pump 75 route the weak absorbent solution (weak in absorbing power) to the solution-cooled rectifier 76, then the solution heat exchanger 77, and finally the distillation column 78. The liquid refluxes down column 78 and into generator 51, where it partially boils. The vapor goes up the column and the strong absorbent liquid is withdrawn via letdown valve 79 or recirculates to the generator. The strong liquid is flashed to intermediate pressure and separated in separator 80, with the vapor routed to intermediate pressure absorber 73 and the liquid cooled in SHX 77 and then let down to low pressure in valve 81.

Liquid refrigerant from condenser receiver 82 is cooled in low pressure refrigerant heat exchanger 83, then expanded (let down in pressure) by valve 84 and supplied to low pressure chiller 60, together with recirculating liquid. Refrigerant vapor is separated at separator 85, and combined with purge liquid from valve 86 to exchanger 83. The warmed refrigerant vapor is routed to low pressure absorber 87, where it is absorbed into absorbent from valve 81 and absorption heat is rejected to ambient. Low pressure receiver 88 and pump 89 route the absorbent to IP absorber 73. Overhead vapor from column 78 is condensed in condenser 90 to form the liquid refrigerant.

Other absorption working pairs may be used, such as $LiBr—H_2O$, and other absorbents for $NH_3$ refrigerant may be used. Other types of refrigeration plant may be used, for example mechanical vapor compression.

What is claimed is:

1. An apparatus for recovering $C_3+$ from gas withdrawn from a catalytic reformer plant comprised of:
    a) a recuperative heat exchanger for cooling the withdrawn gas below ambient temperature;
    b) a chiller heat exchanger for further cooling the withdrawn gas to below −15° C., such that part of the $C_3+$ condenses;
    c) a separator which separates condensed $C_3+$ from the chilled withdrawn gas;
    d) a conduit which directs the separated withdrawn gas to said recuperative heat exchanger, for warming therein;
    e) a source of refrigeration for said chiller comprised of a waste heat-powered absorption refrigeration plant; and
    f) a naphtha desulfurizer which receives at least part of the warmed gas, and a conduit which supplies liquid $C_3+$ to a distillation column.

2. The apparatus according to claim 1 wherein said source of refrigeration is a waste heat-powered absorption refrigeration plant.

3. The apparatus according to claim 2 additionally comprised of a heat exchanger which transfers waste heat from the circulating gas of said catalytic reformer plant to said absorption refrigeration plant.

4. An apparatus for recovering $C_3+$ from gas withdrawn from a catalytic reformer Plant comprised of:
   a) a recuperative heat exchanger for cooling the withdrawn gas below ambient temperature;
   b) a chiller heat exchanger for further cooling the withdrawn gas to below $-15°$ C., such that part of the $C_3+$ condenses;
   c) a separator which separates condensed $C_3+$ from the chilled withdrawn gas;
   d) a conduit which directs the separated withdrawn gas to said recuperative heat exchanger, for warming therein; and
   e) a source of refrigeration for said chiller comprised of a waste heat-powered absorption refrigeration plant.
   wherein said absorption refrigeration plant is comprised of:
   i) a low pressure evaporator and absorber for supplying refrigeration below $-15°$ C. to said chiller;
   ii) an intermediate pressure evaporator and absorber for supplying refrigeration between about $0°$ C. and $7°$ C. to another refinery stream; and
   iii) a flash tank plus conduit which route the flash gas from pressure reduction of the absorbent solution to said intermediate pressure absorber.

5. The apparatus according to claim 4 additionally comprised of a chiller for the inlet gas to the wet gas compressor, which receives said $0°$ C. to $7°$ C. refrigeration.

6. The apparatus according to claim 4 additionally comprised of a chiller for the inlet air to the FCC regeneration air compressors.

7. The apparatus according to claim 4 comprised of ammonia as the refrigerant and water as the absorbent solution, and comprised of a solution-cooled heat exchanger inside the absorption plant rectifier.

8. A process for recovering liquefied petroleum gas (LPG) and gasoline from catalytic reformer plant treat gas comprising:
   a) recuperatively cooling the treat gas to below ambient temperature;
   b) chilling the cooled treat gas to below $-10°$ C., whereby $C_3+$ is condensed;
   c) separating the condensed $C_3+$ from the remaining chilled treat gas;
   d) recuperatively warming the chilled treat gas to near ambient temperature; and
   e) seperating the condensed $C_3+$ to gasoline and LPG.

9. The process according to claim 8 additionally comprising supplying waste heat from said catalytic reformer plant directly to an absorption refrigeration plant, and supplying refrigeration from said absorption refrigeration plant to said chilling step.

* * * * *